US012723560B1

(12) United States Patent
Neuhoff et al.

(10) Patent No.: US 12,723,560 B1
(45) Date of Patent: Sep. 1, 2026

(54) FUEL DELIVERY ASSEMBLY

(71) Applicant: Caterpillar Inc., Peoria, IL (US)

(72) Inventors: Brandon Neuhoff, Dunlap, IL (US); William Barnes, Rapid City, SD (US); Douglas Tuenge Scott, Rapid City, SD (US); Bobby John, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 19/173,929

(22) Filed: Apr. 9, 2025

(51) Int. Cl.
*F02M 21/00* (2006.01)
*F02M 21/02* (2006.01)
*F02M 35/10* (2006.01)

(52) U.S. Cl.
CPC .... *F02M 21/0242* (2013.01); *F02M 21/0272* (2013.01); *F02M 35/10216* (2013.01)

(58) Field of Classification Search
CPC ... F02B 31/06; F02B 27/0273; F02M 35/104; F02M 35/10255; F02M 35/10072; F02M 35/10078; F02M 35/10085; F02M 21/00; F02M 21/02; F02M 21/0242; F02M 21/0272; F02M 21/0257; F02M 35/10216
See application file for complete search history.

(56) References Cited

U.S. PATENT DOCUMENTS

| | | | | |
|---|---|---|---|---|
| 5,632,253 | A | 5/1997 | Paul | |
| 9,650,955 | B2 | 5/2017 | Sabelhaus | |
| 9,732,713 | B2 | 8/2017 | Bandyopadhyay | |
| 2004/0177838 | A1 * | 9/2004 | Veinotte ........... | F02M 35/10255 123/568.17 |
| 2004/0182369 | A1 * | 9/2004 | Everingham ...... | F02M 25/0836 123/520 |

FOREIGN PATENT DOCUMENTS

| | | | | | |
|---|---|---|---|---|---|
| CN | 112780463 | A * | 5/2021 | ............. | F02M 43/04 |
| DE | 1928925 | A1 * | 12/1970 | | |
| DE | 10332640 | B3 * | 12/2004 | .......... | F02B 27/0273 |
| EP | 2706214 | A1 | 3/2014 | | |
| EP | 2952713 | B1 | 12/2015 | | |
| KR | 20200074057 | A * | 6/2020 | ............. | F02B 31/06 |

* cited by examiner

*Primary Examiner* — George C Jin
*Assistant Examiner* — Teuta B Holbrook

(57) ABSTRACT

A fuel delivery assembly for directing fuel into an intake manifold of an internal combustion engine includes a fuel tube having an aperture through a sidewall and a flapper pivotably secured to an interior of the sidewall adjacent to the aperture. The flapper is configured to pivot between an open and closed configuration. The flapper pivots to the closed configuration when fuel is provided through the fuel delivery assembly and pivots to the open configuration to allow air to pass through the aperture to flush residual fuel from the fuel tube and into the combustion chamber.

20 Claims, 8 Drawing Sheets

FUEL DELIVERY ASSEMBLY

TECHNICAL FIELD

The present disclosure relates generally to systems and methods for directing fuel into an intake manifold, and more particularly, to a fuel delivery assembly for directing fuel into an intake manifold of an internal combustion engine.

BACKGROUND

In an internal combustion engine, fuel may be provided to the combustion chamber of the engine via direct injection or port-injection. In direct injection, the fuel is injected directly into the combustion chamber. In port-injection, the fuel is injected into the intake manifold, where it mixes with air coming into the engine and then is drawn into the combustion chamber, where it more completely mixes prior to combustion.

However, in port-injection, residual fuel may be left behind within the fuel line and/or the intake manifold when the intake valve closes. Approaches have been developed to address this, for example, U.S. Pat. No. 9,732,713 B2, titled "Purge System for a Dual-Fuel Engine," filed on Apr. 10, 2015, is directed to a fuel system including a purge system configured to purge residual gaseous fuel from the fuel line.

For these reasons, there is a need for improved devices, systems, and methods for injecting fuel into an intake manifold of an engine.

SUMMARY

In an aspect of the present disclosure a fuel delivery assembly for directing fuel into an intake manifold of an internal combustion engine is provided. The fuel delivery assembly includes a fuel tube for directing fuel into the intake manifold and a flapper configured to pivot between a closed configuration and an open configuration. The fuel tube has an aperture through a sidewall of the fuel tube. When the flapper is in the closed configuration, it is in contact with the sidewall and covers the aperture and when the flapper is in the open configuration, it is not in contact with the sidewall and allows fluid communication through the aperture.

In another aspect of the present disclosure, an internal combustion engine is provided. The internal combustion engine includes a fuel supply line, a gas admission valve to control fuel flow through the fuel supply line, an intake manifold, and a fuel delivery system. The intake manifold has a manifold wall defining an interior void, and the manifold wall has an opening connected to the fuel supply line. The fuel delivery system includes a fuel tube having an upstream and a downstream end. The upstream end is connected to the opening in the manifold wall and the downstream end is positioned within the interior void. The fuel tube provides fluid communication between the gas admission valve and the interior void and has an aperture extending through a sidewall of the fuel tube. The fuel delivery system further includes a flapper pivotably secured to an interior of the fuel tube adjacent to the aperture. The flapper is configured to pivot between a closed configuration and an open configuration. When in the closed configuration, the flapper is in contact with the sidewall and covers the aperture, and when in the open configuration, the flapper is not in contact with the sidewall and allows fluid communication between the fuel tube and the interior void through the aperture.

In yet another aspect of the present disclosure a method for operating an internal combustion engine is provided. The internal combustion engine includes an intake manifold, a combustion chamber having a piston, an intake valve between the manifold and the combustion chamber, and a fuel delivery assembly having a fuel tube positioned within an interior void of the intake manifold, the fuel tube having an aperture with a flapper pivotable between a closed configuration and an open configuration. The method includes providing fuel from a fuel source into a passageway of the fuel tube and pivoting the flapper to the closed configuration. When in the closed configuration, the flapper is in contact with the sidewall and covers the aperture. The method includes moving the piston downward, opening the intake valve, providing air into the interior void of the intake manifold, and terminating provision of fuel from the fuel source into the passageway of the fuel tube. The method also includes pivoting the flapper to the open configuration. When in the open configuration, the flapper is not in contact with the sidewall. The method includes passing air from the interior void of the manifold through the aperture and into the passageway. The method further includes drawing a mixture of the fuel and air from the passageway through the intake valve and into the combustion chamber.

BRIEF DESCRIPTION OF THE DRAWINGS

For purpose of illustration, certain embodiments of the present disclosure are shown in the accompanying drawings. It should be understood, however, that the present disclosure is not limited to the precise embodiments and features shown. A better understanding of the features and advantages of the present disclosure will be obtained by reference to the foregoing summary, the following detailed description, and the accompanying drawings of which.

DETAILED DESCRIPTION

Embodiments of the present disclosure relate generally to devices, systems, and methods for directing fuel into an intake manifold of an engine system. The presently disclosed fuel delivery assembly, engine system, and method of use flushes residual fuel from the fuel line, decreasing the likelihood of pre-ignition occurring in the fuel line and/or intake manifold.

Figure 1:
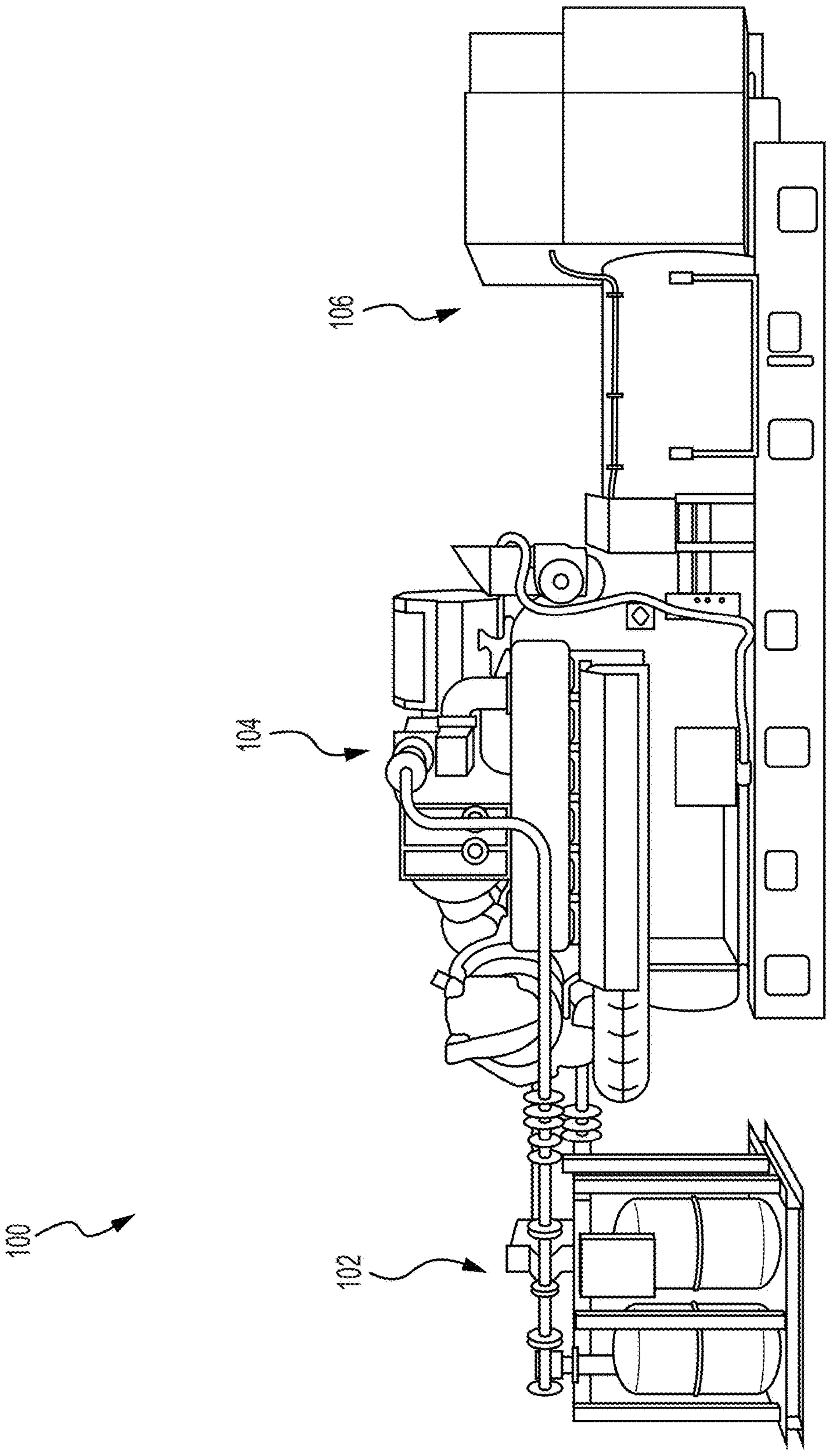
FIG. 1 is a side view of an engine system.

To begin a detailed description, reference is made to FIG. 1, which illustrates an engine system 100 in which the devices, systems, and methods of the present disclosure may be implemented.

The engine system 100 includes a fuel supply system 102, an internal combustion engine 104, and an electrical generator 106. The fuel supply system 102 provides gaseous fuel to the engine 104. In the engine 104, the gaseous fuel is mixed with air and ignited, causing combustion. Expansion of the high-temperature and high-pressure gases during combustion applies force to a component (e.g., pistons) of the internal combustion engine 104 to move the component and power the electrical generator 106.

Figure 2:
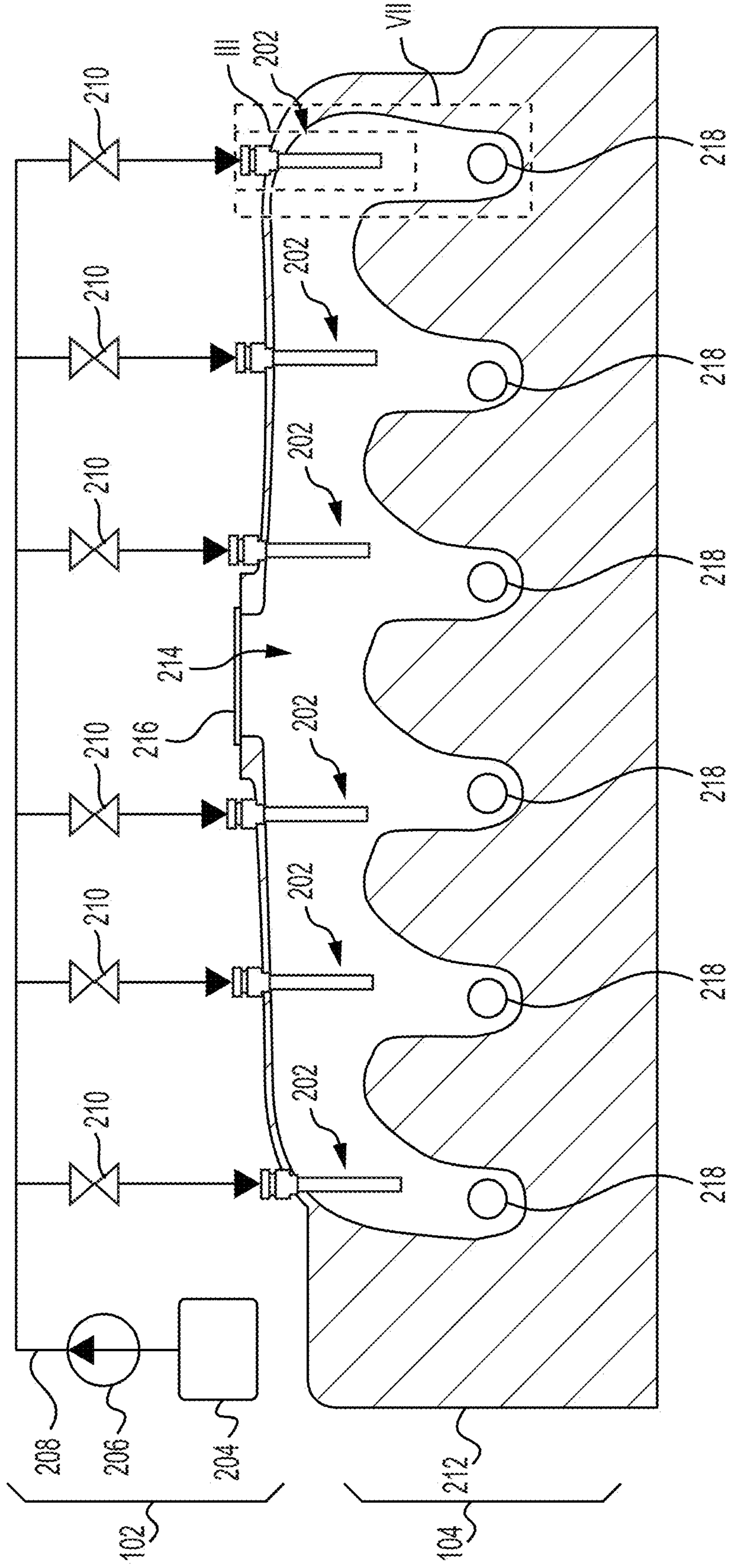
FIG. 2 is a partial schematic and partial cross-sectional view of a portion of the engine system unit of FIG. 1.

Although a reciprocating engine, i.e., a piston engine, is depicted in FIG. 2, those skilled in the art will recognize that the devices, systems, and methods of the present disclosure may be implemented in other types of internal combustion engines. Those skilled in the art will further recognize that although an electrical generator 106 is depicted in FIG. 2, the engine 104 of the present disclosure may be used to provide power to any number of devices, such as a mobile machine, automobile, airplane, locomotive, pump, or compressor, just to name a few.

FIG. 2 shows a schematic view of the fuel supply system 102 and a partial cross-sectional view of a portion of the engine 104 of the engine system 100 of FIG. 1. The fuel supply system 102 provides fuel to the engine 104 via one or more fuel delivery assemblies 202.

The fuel supply system 102 includes a fuel tank 204 for storing fuel, a fuel pump 206 for pumping fuel from the fuel tank 204 to the engine 104, a fuel supply line or fuel supply lines 208, through which the fuel is transported to the fuel delivery assemblies 202 and further into the engine 104, and a gas admission valve 210 for each fuel supply line 208 to control the admission of gas into the engine 104.

The engine 104 includes an intake manifold 212 including a manifold wall 213 defining an interior void 214. The manifold wall 213 has an air inlet 216, which through which air flows into the interior void 214. The one or more fuel delivery assemblies 202 are coupled to a fuel supply line 208 and protrude through an opening in the manifold wall 213 into the interior void 214. Each fuel supply line 208 includes a gas admission valve 210 controlling the flow of fuel through the fuel supply line 208 and each fuel delivery assembly 202 directs the fuel into the interior void 214, where it mixes with the air.

The engine 104 further includes one or more combustion chambers 702 (see FIGS. 7A-7D) and one or more intake valves 218 that open and close to control the flow of air and fuel into the corresponding combustion chambers 702. Although six fuel delivery assemblies 202 and six intake valves 218 are shown in FIG. 2, those skilled in the art will recognize that the number of fuel delivery assemblies 202 and intake valves 216 correspond to the number of combustion chambers 702, which may vary depending on the type of engine 104.

Figure 3A:
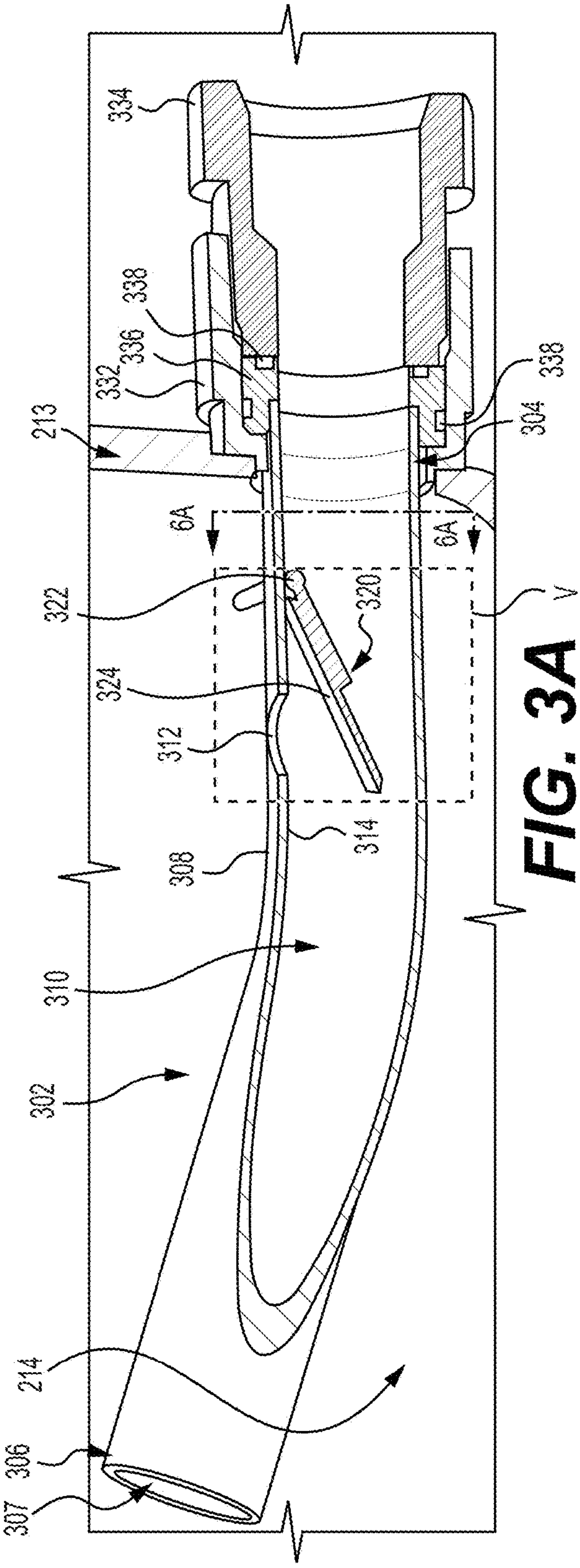
FIGS. 3A-3B are cross-sectional views of a portion of an intake manifold of the engine of FIG. 2 and a fuel delivery assembly of the present disclosure, illustrating the fuel delivery assembly in an open configuration and closed configuration, respectively.
Figure 3B:
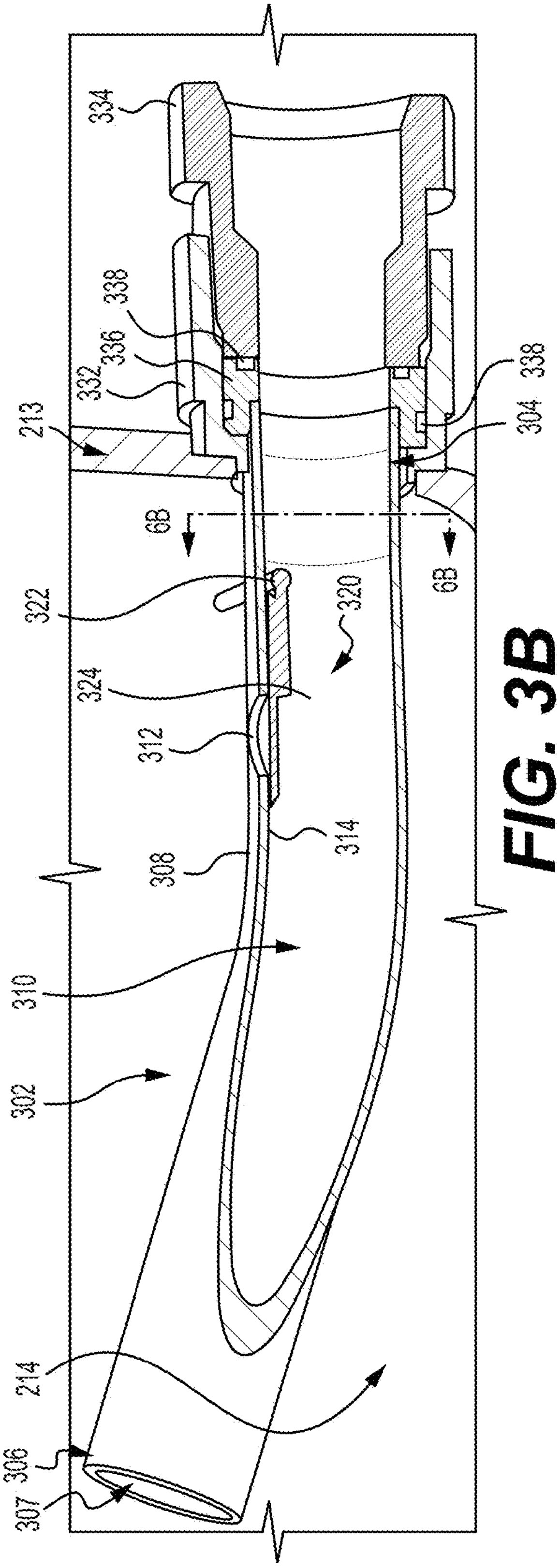

FIGS. 3A-3B are cross-sectional views of a portion of the intake manifold 212 and the fuel delivery assembly 202 indicated in the dashed-line box labeled "III" in FIG. 2.

The fuel delivery assembly 202 includes a fuel tube 302 having an upstream end 304 and a downstream end 306. The fuel tube 302 is coupled to the intake manifold 212 at the upstream end 304 and the downstream end 306 extends into the interior void 214 of the intake manifold 212. The fuel tube 302 includes an opening 307 at the downstream end 306.

The fuel tube 302 includes a sidewall 308, defining a passageway 310. The sidewall 308 may be made of aluminum, cast iron, stainless steel, or other metals or alloys known in the art for being resistant to corrosion and that can withstand the high pressures and high temperatures within the engine 104. The passageway 310 is in fluid communication with the fuel supply line 208 (FIG. 2) and directs the fuel from the supply line 208 into the interior void 214 of the intake manifold 212. When fuel is supplied to the fuel tube 302, it passes through the passageway 310 and out the opening 307 at the downstream end 306 of the fuel tube 302, into the interior void 214.

Figure 5B:
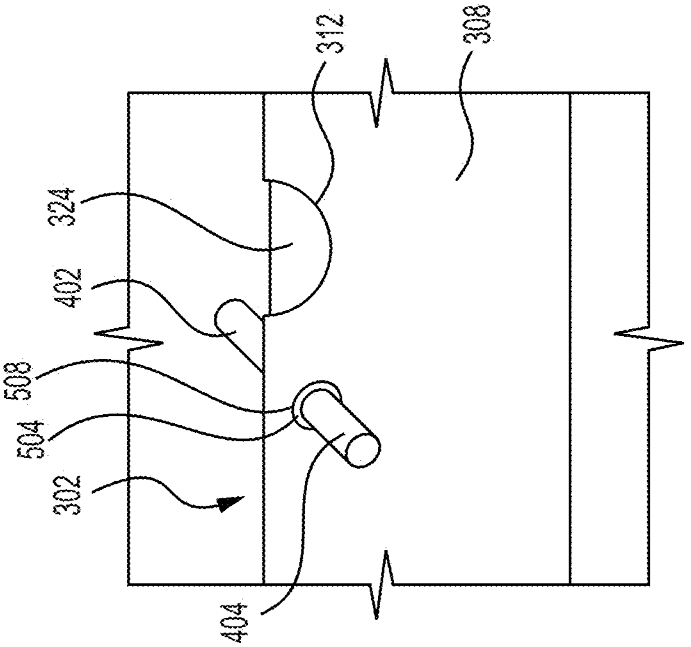
FIGS. 5A-5B are front and rear views of a portion of the fuel delivery assembly of FIG. 3A, illustrating additional features of the fuel delivery assembly.
Figure 5A:
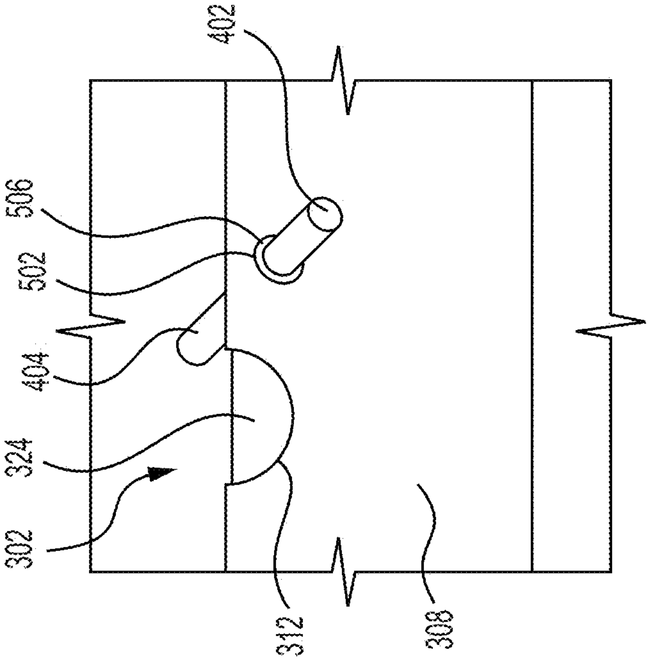

The fuel tube 302 further includes an aperture 312 through the sidewall 308 and a flapper 320 secured to an interior 314 of the sidewall 308 (see also, FIGS. 5A and 5B). The flapper 320 is pivotably secured to the sidewall 308 and is configured to pivot between an open configuration (as shown in FIG. 3A) and a closed configuration (as shown in FIG. 3B). The flapper 320 includes a pivot arm 322 and a main body 324 coupled to the pivot arm 322, and may be made of plastic aluminum, cast iron, stainless steel, or other metals or alloys. In some instances, the flapper 320 may be 3D printed.

As shown in FIG. 3A, when the flapper 320 is in the open configuration, the main body 324 of the flapper 320 is pivoted away from or spaced apart from the aperture 312, such that the main body 324 of the flapper 320 is not in contact with the interior 314 of the sidewall 308. When the flapper 320 is in the open configuration, fluid communication is permitted through the aperture 312, between the interior void 214 of the intake manifold 212 and the passageway 310 of the fuel tube 302.

As shown in FIG. 3B, when the flapper 320 is in the closed configuration, the main body 324 of the flapper 320 is in contact with the sidewall 308 and fits into or covers the aperture 312. Further, when the flapper 320 is in the closed configuration, fluid communication generally is not permitted through the aperture 312, between the interior void 214 of the intake manifold 212 and the passageway 310 of the fuel tube 302.

Still referring to FIGS. 3A-3B, the upstream end 304 of each of the fuel delivery assemblies 202 may be coupled to the opening in the manifold wall 213 via a mounting ring 332. The mounting ring 332 may be welded or otherwise secured to the manifold wall 213. Each mounting ring 332 is in fluid communication with one of the fuel lines 208 and may be connected to its corresponding fuel line directly or indirectly. For example, in FIGS. 3A-3B each of the fuel supply lines 208 include an intake port 334 configured to couple with one of the mounting rings 332. Each of the intake ports 334 are coupled to its corresponding mounting ring 332 via a threaded coupling or another type of coupling known in the art. In some instances, each fuel delivery assembly 202 may further include a sealing component 336 provided between the mounting ring 332 and the intake port 334. The sealing component 336 may be an o-ring or may be a component configured to receive one or more o-rings therein, to provide a fluid-tight and/or air-tight seal between the mounting ring 332 and the intake port 334. In FIGS. 3A-3B, the sealing component 336 includes two grooves 338 configured to receive o-rings therein.

Figure 4:
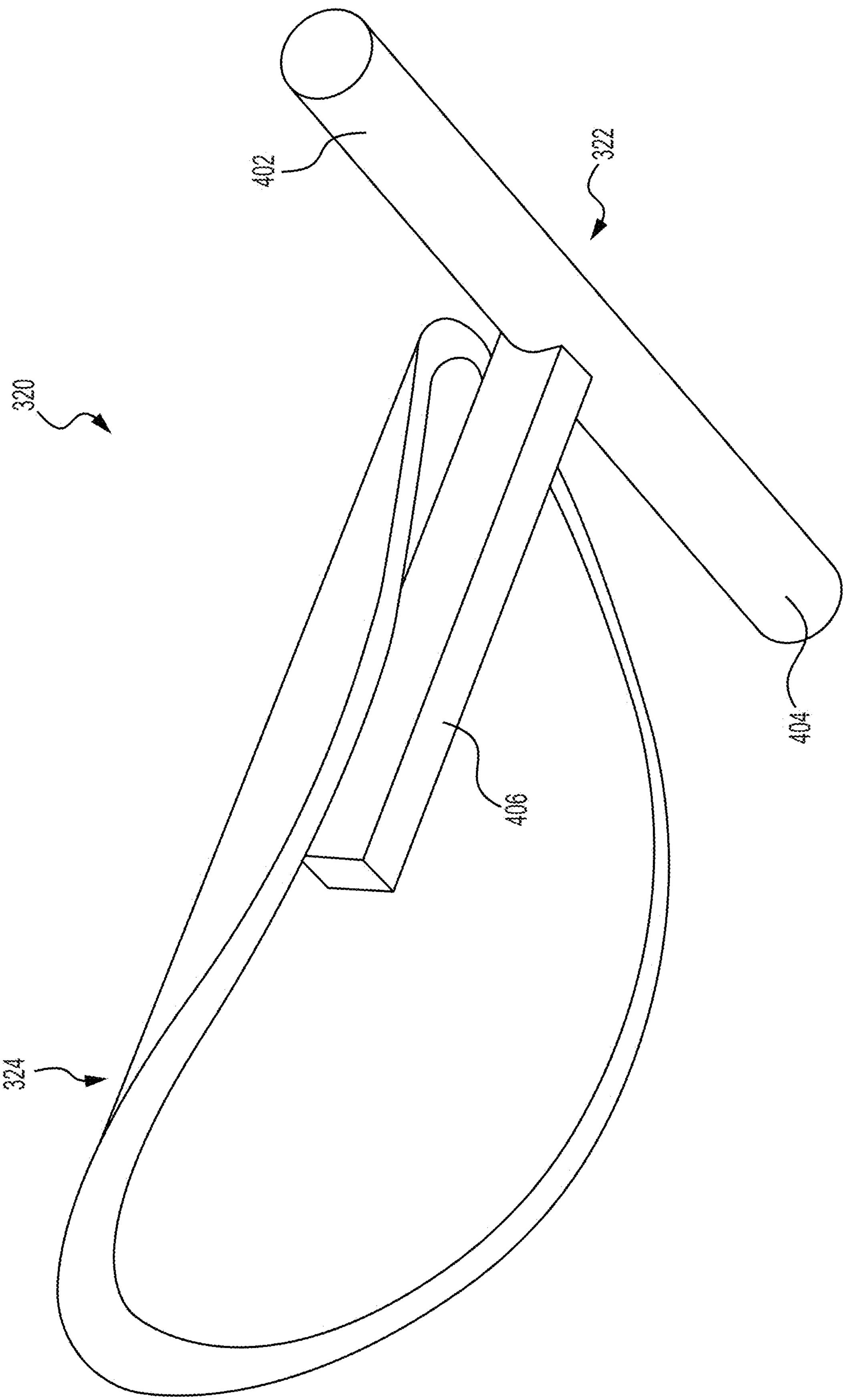
FIG. 4 is a perspective view of a portion of the fuel delivery assembly of the present disclosure.

Turning to FIG. 4, a perspective view of the flapper 320 is shown. In some instances, the main body 324 of the flapper 320 may be rounded or saddle-shaped or otherwise curved to match the interior 314 of the sidewall 308. However, a person of skill in the art will understand that the main body 324 of the flapper 320 is sized and shaped to fit into or cover the aperture 312. As such, the size and shape of the main body 324 are determined by the size and shape of the interior 314 of the sidewall 308 and the aperture 312. In some instances, there may be a seal (not shown) disposed between the flapper 320 and the sidewall 308, around or within the aperture 312.

Still referring to FIG. 4, in some instances, the pivot arm 322 may be a T-shaped bar, having a first arm 402 and a second arm 404 extending in opposite directions from a midline of the T-shaped bar and a third arm 406 extending along the midline, orthogonal to the first arm 402 and the second arm 404. However, those skilled in the art will recognize that the pivot arm 322 may be any shape that allows the pivot arm 322 to couple to the interior 314 of the sidewall and allow the pivot arm 322 to pivot. Further, those skilled in the art will recognize that there are other manners of mounting the flapper for movement between the open position and the closed position.

FIGS. 5A-5B are front and rear views, respectively, of a portion of the fuel delivery assembly 202 indicated by the dashed-line box labeled "V" on FIG. 3A. In some instances, the fuel tube 302 may further include a first hole 502 through the sidewall 308, through which the first arm 402 of the pivot arm 322 of the flapper 320 may be inserted. The fuel tube 302 may further include a second hole 504 through the sidewall 308, through which the second arm 404 of the pivot arm 322 of the flapper 320 may be inserted. The first and second arms 402, 404 may extend from the passageway 310, through the first and second holes 402, 404 of the sidewall 308 respectively. The first and second arms 402, 404 are configured to pivot within the first and second holes 502, 504, allowing the flapper 320 to pivot.

The fuel tube 302 may further include a first seal 506 disposed within the first hole 502 and a second seal 508 disposed within the second hole 504. The first and second seals 506, 508 are configured to fit between the first and second holes 502, 504 and the first and second arms 402, 404, to prevent fluid communication between the interior void 214 of the intake manifold 212 through the first and second holes 502, 504, while still allowing the first and second arms 402, 404 to pivot within the first and second holes 502, 504. In some instances, the first and second seals 506, 508 may be ring-shaped.

Figure 6B:
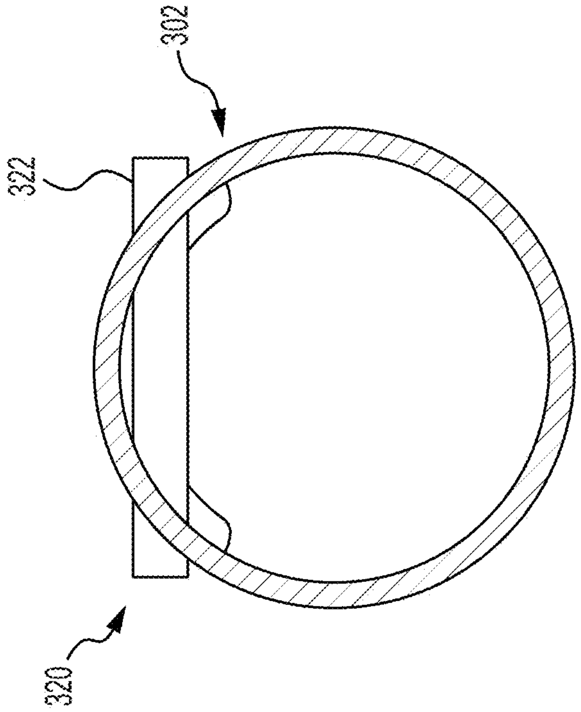
FIG. 6B is a cross-sectional view of the fuel delivery assembly of FIG. 3B.
Figure 6A:
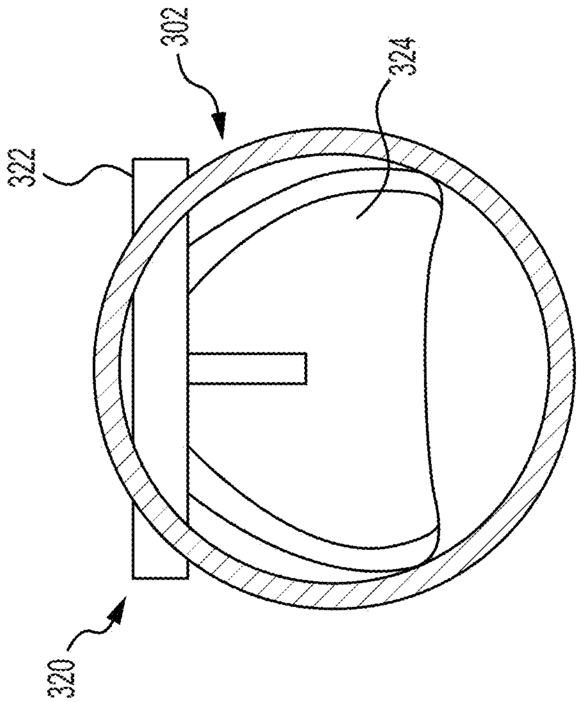
FIG. 6A is a cross-sectional view of the fuel delivery assembly of FIG. 3A.

FIG. 6A is a cross-sectional view of the fuel delivery assembly, taken along the dashed-line labeled "6A" indicated on FIG. 3A. FIG. 6B is a cross-sectional view of the fuel delivery assembly, taken along the dashed-line labeled "6B" indicated on FIG. 3B. In FIG. 6A, the flapper 320 is shown in the open configuration and in FIG. 6B, the flapper 320 is shown in the closed configuration.

The flapper 320 may be balanced to move between the open configuration and closed configuration passively, due to gravity and the pressure changes in the fuel delivery assembly 202 during periods of fuel admission and when fuel is not being provided (as shown in FIGS. 7A-7D). However, in some instances, the flapper 320 may be biased by a spring that assists in the opening and closing of the flapper 320.

INDUSTRIAL APPLICABILITY

FIGS. 7A-7D are simplified cross-sectional views of the intake manifold 212 and fuel delivery assembly 202 indicated in the dashed line box labeled "VII" in FIG. 2, illustrating the fuel delivery assembly 202 in operation. During operation, while fuel is being provided to the fuel delivery assembly 202, fuel flows through the delivery assembly 202. Upon termination of the flow of fuel through the fuel line 208, the fuel delivery assembly 202 flushes residual fuel from the fuel line 208, decreasing the likelihood of pre-ignition occurring in the fuel line and/or intake manifold 212.

Figure 7A:
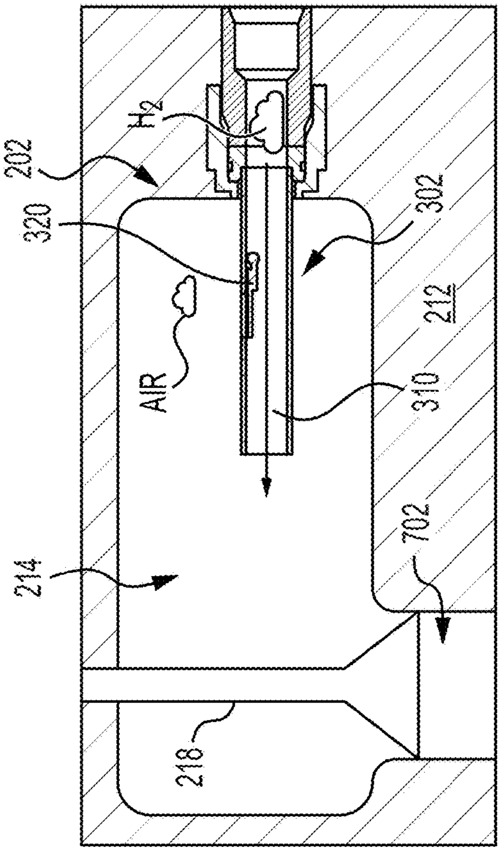
FIGS. 7A-7D are simplified cross-sectional views of the intake manifold and fuel delivery assembly of the present disclosure, illustrating the fuel delivery assembly in operation.

More specifically, FIG. 7A shows the start of an intake stroke of the engine 104. At the start of the intake stroke, the intake valve 218 is in a closed position over the combustion chamber 702, i.e., the combustion chamber 702 is closed. Fuel is supplied to the fuel delivery assembly 202. Although the fuel depicted in FIGS. 7A-7D is hydrogen ($H_2$), those skilled in the art will further recognize that any gaseous fuel suitable for the internal combustion engine 104 may be used.

Still referring to FIG. 7A, the pressure of the supplied fuel causes the flapper 320 to move to the closed position and all or most of the fuel moves through the fuel tube 302 of the fuel delivery assembly 202 and into the interior void 214 of the intake manifold 212.

Figure 7B:
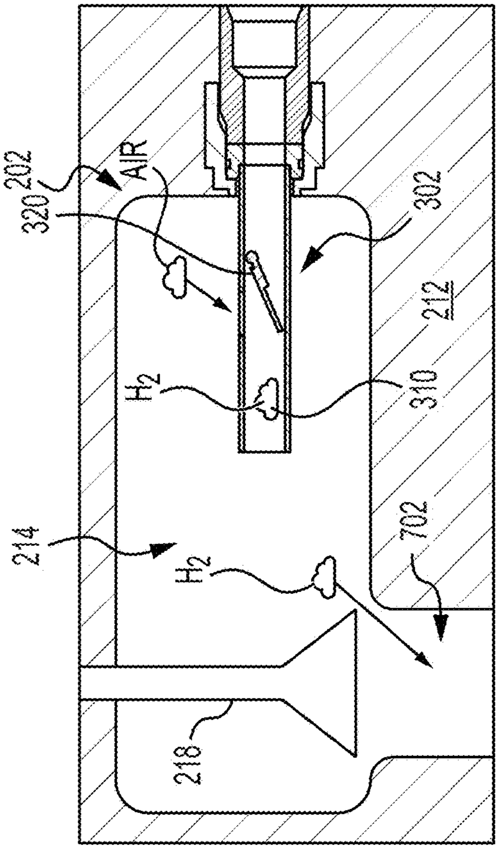

Turning to FIG. 7B, as the intake stroke progresses, the intake valve 218 begins to open and the flow of fuel ceases. As the flow of fuel ceases, the pressure within the fuel tube 302 decreases and the flapper 320 drops to the open position due to gravity. As the intake valve 218 opens, a piston (not shown) within the combustion chamber 702, moves downward, drawing air and fuel ($H_2$) into the combustion chamber 702. This causes at least some of the fuel ($H_2$) to enter the combustion chamber 702 and draws air through the aperture 312 into the passageway 310 of the fuel tube 302. More specifically, even after the valve for the specific cylinder is closed, movement of air within the interior void 214 of the intake manifold 212 during operation of the other cylinders causes the air to move through the aperture 312 into the passageway 310 of the fuel tube 302.

Figure 7C:
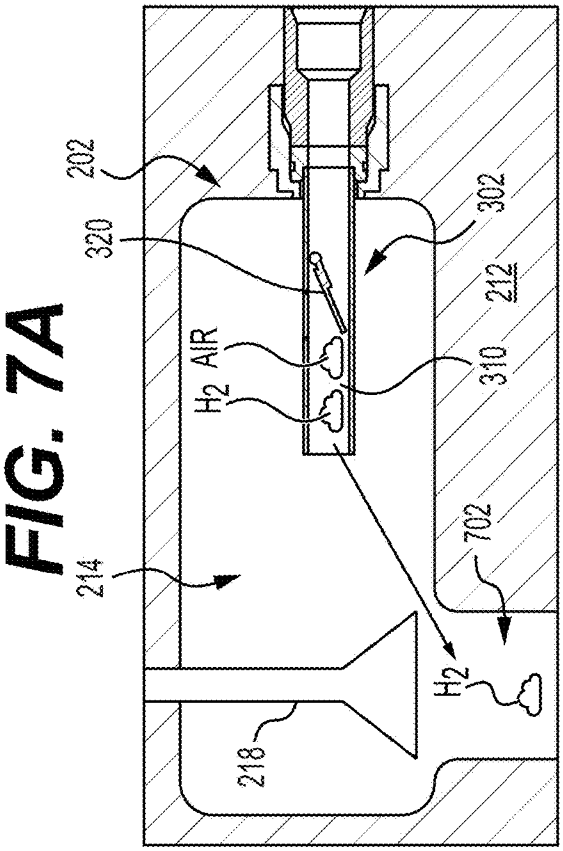
Figure 7D:
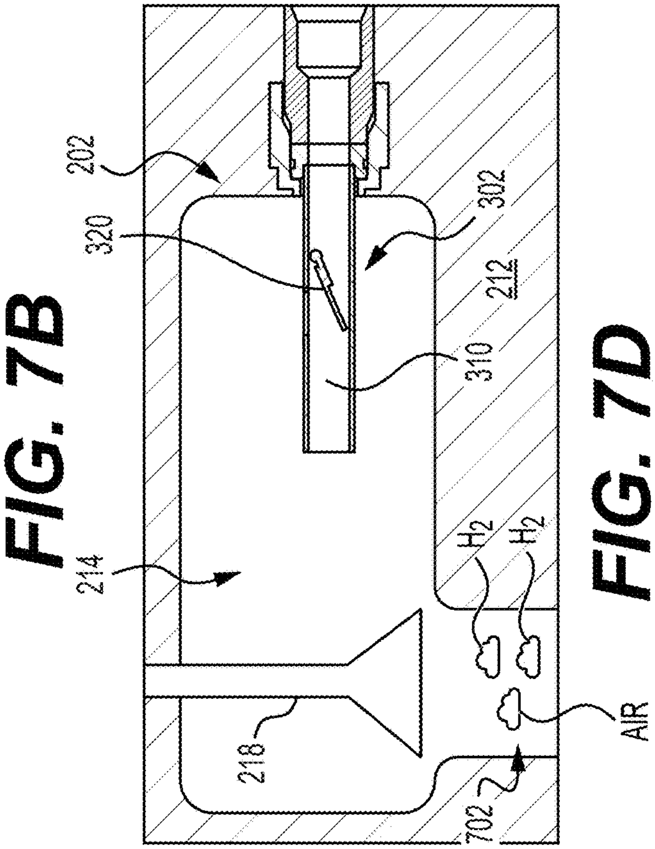

At FIG. 7C, the air is drawn from the passageway 310 of the fuel tube 302, flushing all or most of the remaining fuel ($H_2$) out of the fuel tube 302, along with the air, through the interior void 214 of the intake manifold, and toward the combustion chamber 702. In any event, the air moving through the aperture 312 dilutes the concentration of the fuel ($H_2$) within the fuel tube 302. Lastly, FIG. 7D shows the air and fuel ($H_2$) in combustion chamber 702.

Figure 8:
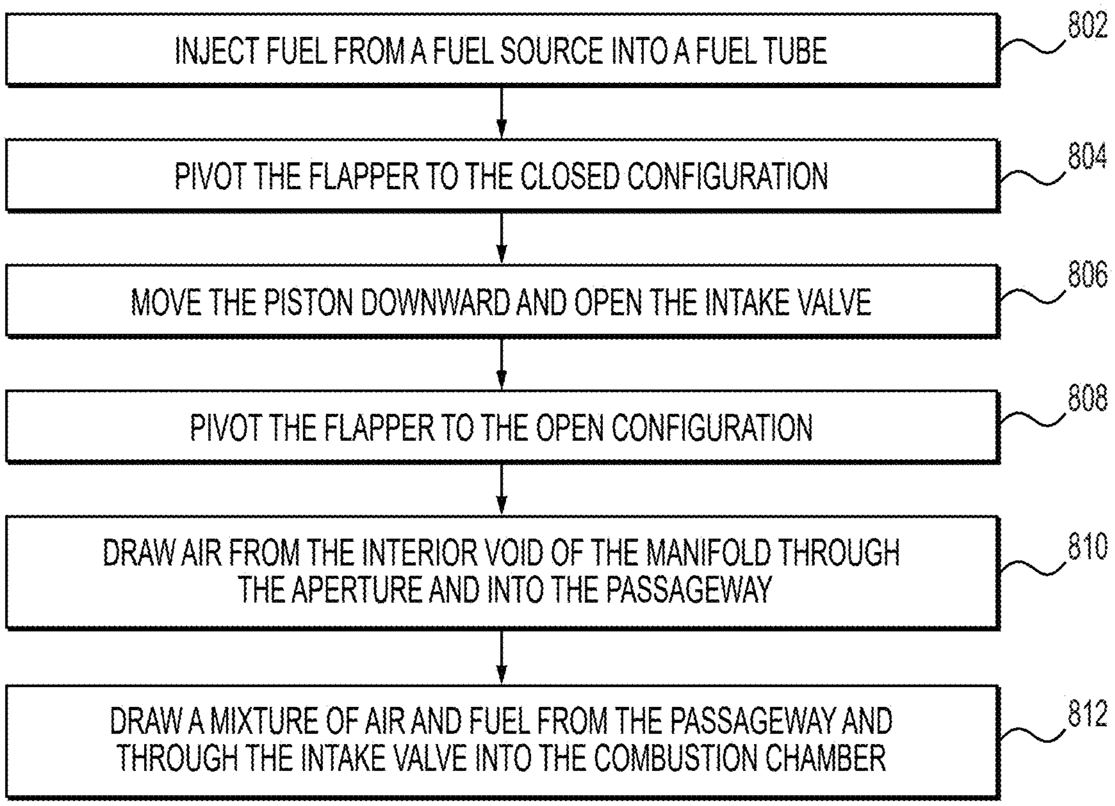
FIG. 8 is a flowchart, illustrating a method for operating an internal combustion engine including a fuel delivery assembly of the present disclosure.

FIG. 8 is a flowchart, illustrating a method for operating the internal combustion engine 104 including the fuel delivery assembly 202 of the present disclosure. Steps 802-812 occur during an intake stroke of the internal combustion engine 104.

At step 802, fuel is provided from a fuel source, such as fuel source 102, into the passageway 310 of the fuel tube 302. The fuel tube 302 includes sidewall 308, aperture 312 through the sidewall, and flapper 320 pivotably secured to the interior 314 of the sidewall 308. The flapper 320 is secured to the interior 314 of the sidewall 308 adjacent to the aperture 312 and is configured to pivot between the open and closed configuration.

At step 804, the flapper 320 pivots to the closed configuration, such that the flapper 320 is in contact with the sidewall 308 and covers the aperture 312. More specifically, the pressure of the fuel being provided through the passageway 310 forces the flapper 320 into the closed configuration.

At step 806, as the intake stroke progresses, a piston of the engine 104 moves downward in combustion chamber 702 and the intake valve 218 begins to open.

At step 808, air is provided into the interior void 214 of the intake manifold 212 through the air inlet 216 in the intake manifold 212.

At step 810, the provision of fuel from the fuel source 102 is terminated.

At step 812, the flapper 320 pivots to the open configuration when the flow of fuel ceases. The pressure within the passageway 310 decreases after the flow of fuel has stopped, allowing the flapper 320 to drop down into the open configuration. In the open configuration, the flapper 320 is not in contact with the sidewall 308.

At step 814, as the intake stroke continues to progress and due to the downward movement of the piston, the air is drawn from the interior void 214 of the intake manifold 212, through the aperture 312 and into passageway 310.

At step 816, the air and fuel mixture is drawn or passed from the passageway 310, through the intake valve 218, and into the combustion chamber 702. The air being drawn through the aperture 312 and into the combustion chamber 702 effectively flushes any residual fuel from the fuel tube 302 and into the combustion chamber 702, thereby reducing the likelihood of pre-ignition occurring within the fuel tube 302.

In some instances, pivoting the flapper to the closed configuration includes pivoting the flapper to the closed configuration when the fuel is being provided from the fuel source into the passageway.

Further, in some instances, pivoting the flapper to the open confirmation includes pivoting the flapper to the open configuration when the fuel is not being provided from the fuel source into the passageway.

The invention claimed is:

1. A fuel delivery assembly for directing fuel into an intake manifold of an internal combustion engine, the fuel delivery assembly comprising:
- a fuel tube for directing fuel into the intake manifold, the fuel tube having an aperture through a sidewall of the fuel tube; and
- a flapper pivotably secured to an interior of the sidewall of the fuel tube adjacent to the aperture, the flapper configured to pivot between a closed configuration and an open configuration, wherein:
  - when in the closed configuration, the flapper is in contact with the sidewall and covers the aperture, and
  - when in the open configuration, the flapper is not in contact with the sidewall and allows fluid communication through the aperture.

2. The fuel delivery assembly of claim 1, wherein the flapper is curved to match an interior curvature of the fuel tube.

3. The fuel delivery assembly of claim 1, wherein the flapper pivots to the closed configuration when fuel is being provided through the fuel tube, and wherein the flapper pivots to the open configuration when fuel is not being provided through the fuel tube.

4. The fuel delivery assembly of claim 1, wherein:
- the fuel tube includes a first hole and a second hole through the sidewall of the fuel tube, the first hole and second hole being located upstream of the aperture; and
- the flapper includes:
  - a T-shaped bar having a first arm and a second arm extending in opposite directions from a midline of the T-shaped bar and a third arm extending along the midline orthogonal to the first arm and the second arm, the first arm extending through the first hole and the second arm extending through the second hole, and
  - a main body fixed to the third arm and configured to contact the sidewall and cover the aperture when in the closed configuration.

5. The fuel delivery assembly of claim 4, wherein the main body is curved to match an interior curvature of the fuel tube.

6. The fuel delivery assembly of claim 4, wherein the fuel tube further includes a first seal between the first hole and the first arm and a second seal between the second hole and the second arm, the first seal and the second seal preventing fluid communication through the first hole and the second hole.

7. The fuel delivery assembly of claim 1, further comprising a mounting ring attached to an upstream end of the fuel tube and securing the fuel tube to an opening in a manifold wall of the intake manifold.

8. An internal combustion engine comprising:
- a fuel supply line;
- a gas admission valve to control fuel flow through the fuel supply line;
- an intake manifold having a manifold wall defining an interior void, the manifold wall having an opening connected to the fuel supply line; and
- a fuel delivery system including:
- a fuel tube having an upstream and a downstream end, the upstream end being connected to the opening in the manifold wall, the downstream end being positioned within the interior void, the fuel tube providing fluid communication between the gas admission valve and the interior void and having an aperture extending through a sidewall of the fuel tube;
- a flapper pivotably secured to an interior of the fuel tube adjacent to the aperture, the flapper configured to pivot between a closed configuration and an open configuration, wherein:
  - when in the closed configuration, the flapper is in contact with the sidewall and covers the aperture, and
  - when in the open configuration, the flapper is not in contact with the sidewall and allows fluid communication between the fuel tube and the interior void through the aperture.

9. The internal combustion engine of claim 8, wherein the flapper is curved to match an interior curvature of the fuel tube.

10. The internal combustion engine of claim 8, wherein the flapper pivots to the closed configuration when fuel is being supplied through the fuel tube, and wherein the flapper pivots to the open configuration when fuel is not being supplied into the fuel tube.

11. The internal combustion engine of claim 10, wherein:
- the fuel tube includes a first hole and a second hole through the sidewall of the fuel tube, the first hole and second hole being located upstream of the aperture; and
- the flapper includes:
  - a T-shaped bar having a first arm and a second arm extending in opposite directions from a midline of the T-shaped bar and a third arm extending along the midline orthogonal to the first arm and the second arm, the first arm extending through the first hole and the second arm extending through the second hole; and
  - a main body fixed to the third arm and configured to form the seal around the aperture.

12. The internal combustion engine of claim 11, wherein the main body is curved to match an interior curvature of the fuel tube.

13. The internal combustion engine of claim 11, wherein the fuel tube further includes a first seal between the first hole and the first arm and a second seal between the second hole and the second arm, the first seal and the second seal configured to prevent gas from escaping the fuel tube around the T-shaped bar and configured to allow the T-shaped bar to pivot.

14. The internal combustion engine of claim 8, further comprising a mounting ring attached to the upstream end of the fuel tube and securing the fuel tube to the opening in the manifold wall of the intake manifold.

15. The internal combustion engine of claim 14, further comprising an intake port connected to the fuel tube, the intake port configured to couple with the mounting ring.

16. The internal combustion engine of claim 15, further comprising a sealing component disposed between the mounting ring and the intake port.

17. The internal combustion engine of claim 16, wherein the sealing component includes a groove configured to receive an o-ring.

18. A method for operating an internal combustion engine, the internal combustion engine including an intake manifold, a combustion chamber having a piston, an intake valve between the intake manifold and the combustion chamber, and a fuel delivery assembly having a fuel tube positioned within an interior void of the intake manifold, the fuel tube having an aperture with a flapper pivotable between a closed configuration and an open configuration, the method comprising:

providing fuel from a fuel source into a passageway of the fuel tube, pivoting the flapper to the closed configuration, wherein, when in the closed configuration, the flapper is in contact with the sidewall and covers the aperture;

moving the piston downward;

opening the intake valve;

providing air into the interior void of the intake manifold;

terminating provision of fuel from the fuel source into the passageway of the fuel tube;

pivoting the flapper to the open configuration, wherein, when in the open configuration, the flapper is not in contact with the sidewall;

passing air from the interior void of the intake manifold through the aperture and into the passageway; and drawing a mixture of the fuel and air from the passageway through the intake valve and into the combustion chamber.

19. The method of claim 18, wherein pivoting the flapper to the closed configuration includes pivoting the flapper to the closed configuration when the fuel is being provided from the fuel source into the passageway.

20. The method of claim 18, wherein pivoting the flapper to the open confirmation includes pivoting the flapper to the open configuration when the fuel is not being provided from the fuel source into the passageway.

* * * * *